United States Patent
Choo et al.

(10) Patent No.: US 10,739,125 B2
(45) Date of Patent: Aug. 11, 2020

(54) PRECISION MEASUREMENT SYSTEM USING INTERFEROMETER AND IMAGE

(71) Applicant: XL PHOTONICS, INC., Daejeon (KR)

(72) Inventors: Heung Ro Choo, Daejeon (KR); Jeong Eun Jeon, Daejeon (KR); Min Soo Kim, Daejeon (KR)

(73) Assignee: XL PHOTONICS, INC., Daejeon (KR)

(*) Notice: Subject to any disclaimer, the term of this patent is extended or adjusted under 35 U.S.C. 154(b) by 39 days.

(21) Appl. No.: 16/302,369

(22) PCT Filed: Apr. 26, 2017

(86) PCT No.: PCT/KR2017/004469
§ 371 (c)(1),
(2) Date: Nov. 16, 2018

(87) PCT Pub. No.: WO2017/200222
PCT Pub. Date: Nov. 23, 2017

(65) Prior Publication Data
US 2019/0301849 A1  Oct. 3, 2019

(30) Foreign Application Priority Data
May 17, 2016 (KR) .......... 10-2016-0060202

(51) Int. Cl.
*G01B 9/02* (2006.01)
*G01B 11/25* (2006.01)
(Continued)

(52) U.S. Cl.
CPC ............. *G01B 9/02* (2013.01); *G01B 11/24* (2013.01); *G01B 11/25* (2013.01); *G02B 26/001* (2013.01)

(58) Field of Classification Search
CPC .... G01B 9/02; G01B 9/02029; G01B 9/0203; G01B 11/002; G01B 11/08; G01B 11/12
See application file for complete search history.

(56) References Cited

U.S. PATENT DOCUMENTS

| | | | | |
|---|---|---|---|---|
| 6,661,502 B1* | 12/2003 | Jakobsen | ............. | G01B 11/08 356/73.1 |
| 2010/0067778 A1* | 3/2010 | Tamamushi | ...... | G01N 21/95607 382/145 |
| 2016/0142678 A1* | 5/2016 | Dawson | ............... | G06K 9/78 348/61 |

FOREIGN PATENT DOCUMENTS

| JP | 09-196624 A | 7/1997 |
|---|---|---|
| JP | 2009508114 A | 2/2009 |

(Continued)

OTHER PUBLICATIONS

Korean Office Action dated Apr. 20, 2017.

*Primary Examiner* — Jonathan M Hansen
(74) *Attorney, Agent, or Firm* — Dilworth & Barrese, LLP.; Michael J. Musella, Esq.

(57) ABSTRACT

The present invention relates to a precision measurement system using an interferometer and an image, comprising: an interferometer for measuring a distance to a movable object by a transfer device; an imaging device which is fixed at a specific position and captures an image of an object located within a specific range; and a control device which calculates absolute coordinates indicating a distance from a reference point to each pixel of the image on the basis of the distance measured by the interferometer and the image obtained by the imaging device, calculates an absolute distance between the pixels of the image on the basis of the absolute coordinates, and measures a length of the object captured by the imaging device using the absolute coordinates or the absolute distance.

5 Claims, 4 Drawing Sheets

(51) Int. Cl.
*G02B 26/00* (2006.01)
*G01B 11/24* (2006.01)

(56) References Cited

FOREIGN PATENT DOCUMENTS

| | | |
|---|---|---|
| KR | 20-2000-0012428 U | 7/2000 |
| KR | 10-2009-0098225 A | 9/2009 |
| KR | 101174000 B1 | 8/2012 |
| KR | 10-2013-0135438 A | 12/2013 |

* cited by examiner

[Fig. 1]
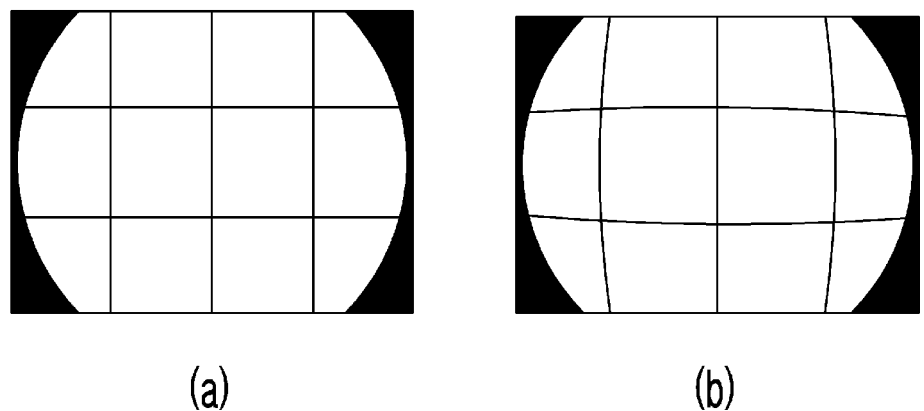
(a)　　　　　　　　　(b)
[Fig. 2]
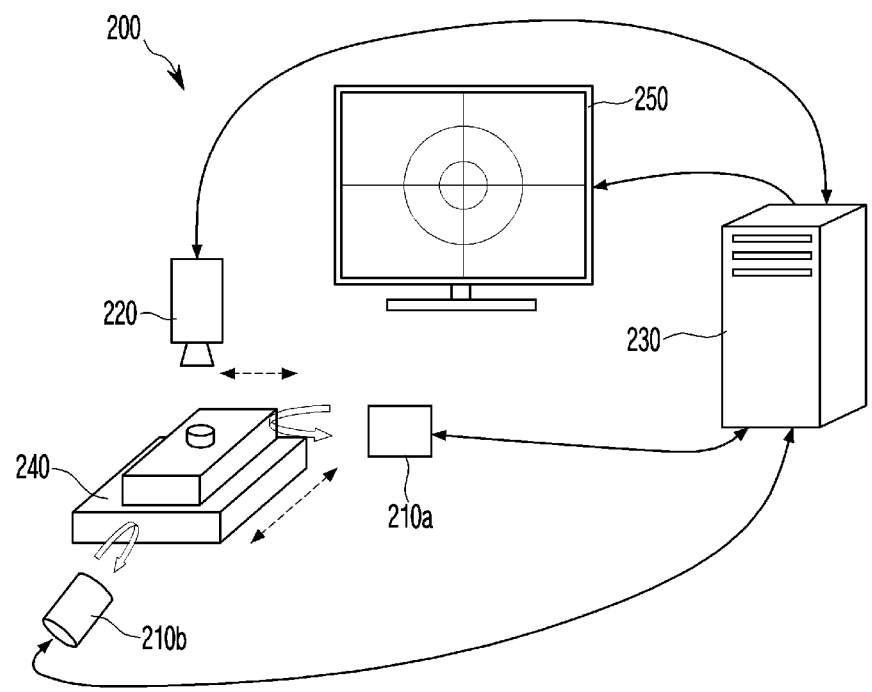

[Fig. 3(a)]
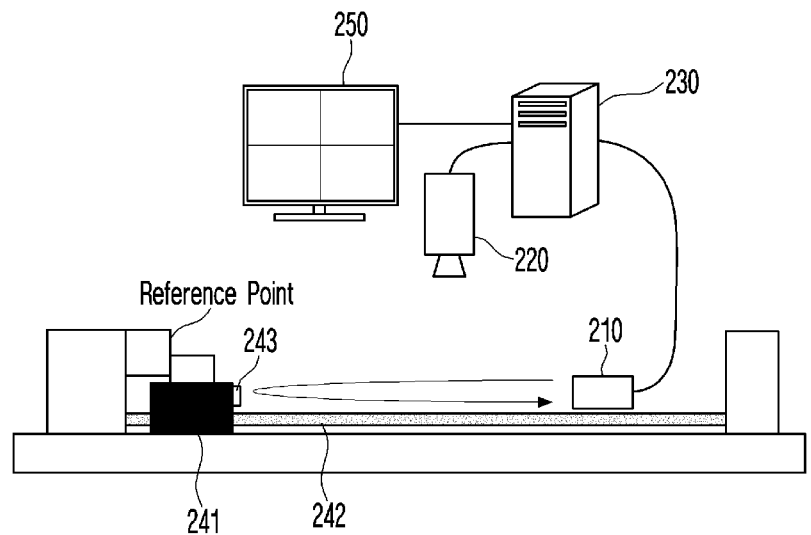
[Fig. 3(b)]
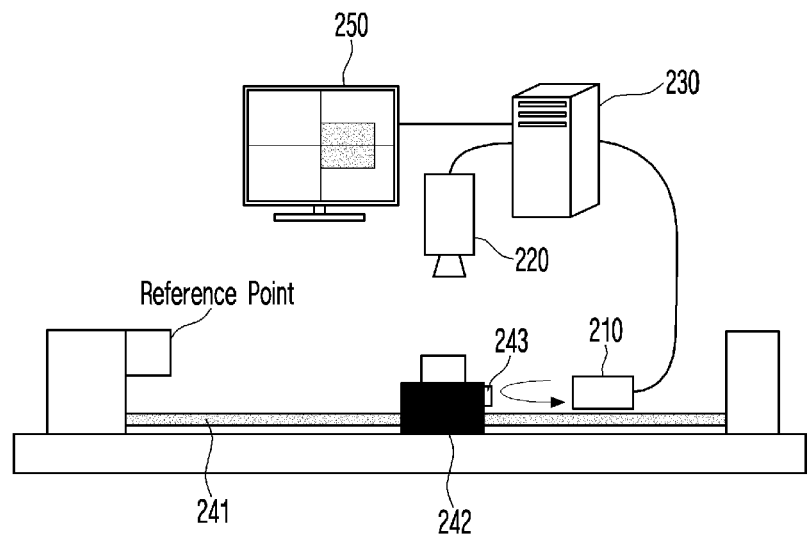

【Fig. 4】
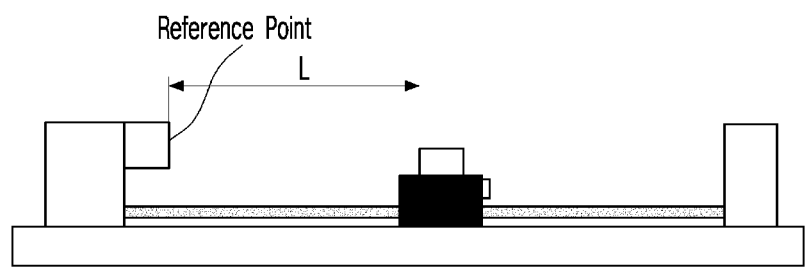
【Fig. 5】
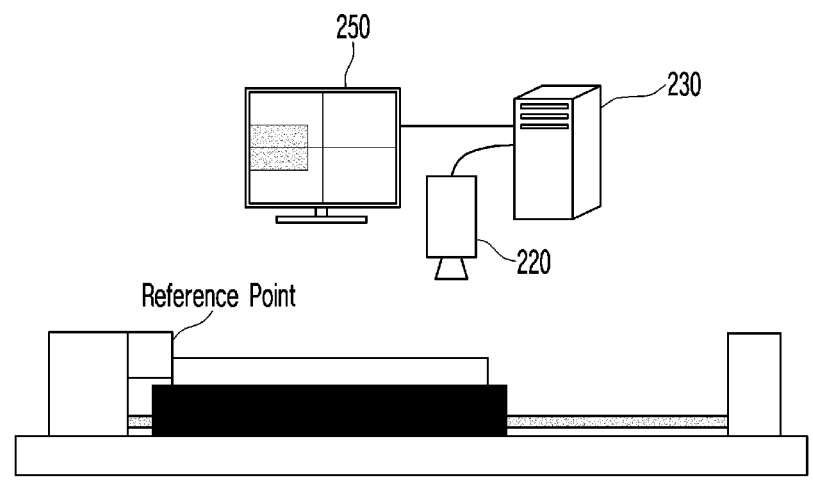

[Fig. 6]
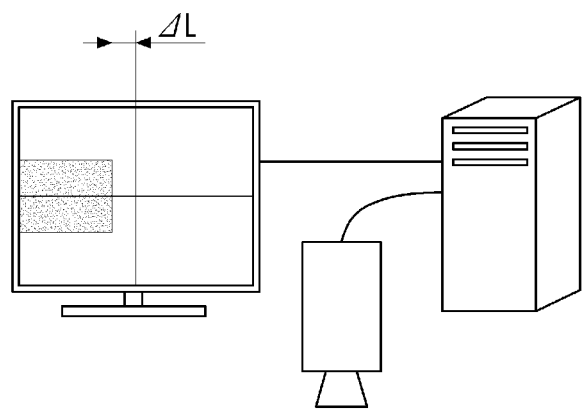
[Fig. 7]
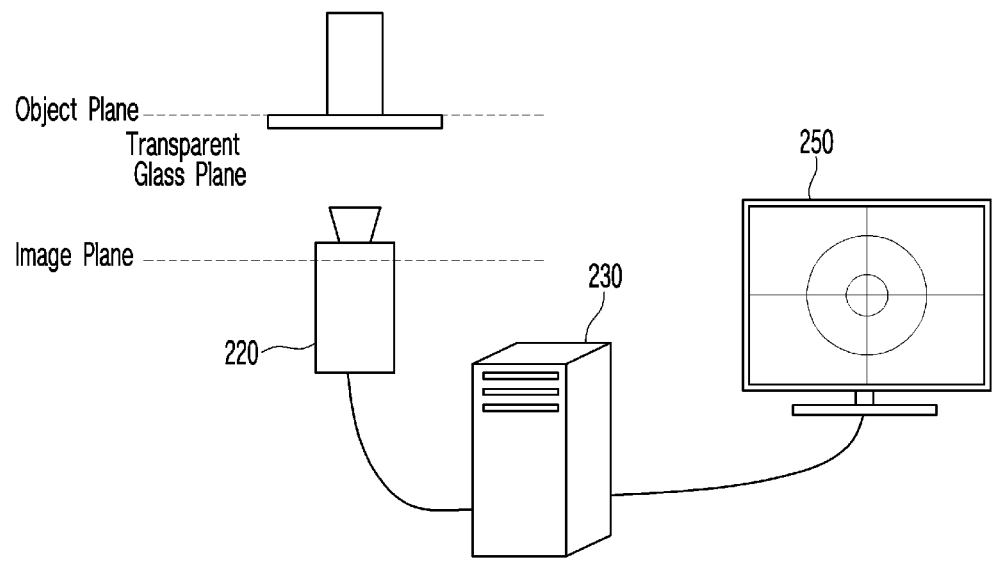

PRECISION MEASUREMENT SYSTEM USING INTERFEROMETER AND IMAGE

TECHNICAL FIELD

The present invention relates to a precision measurement technology, and more particularly, to a precision measurement system for precisely measuring a length, an inner or outer diameter of the object using an interferometer and an image:

BACKGROUND

To manufacture the precise structures or machines, parts (or components) are needed to be precisely measured.

Micrometers or Vernier calipers have generally been used to measure lengths, inner or outer diameters of the parts. These devices normally have measurement errors of approximately 10 µm for the lengths, inner and/or outer diameters of the objects, however they cannot guarantee precise measurement in case the length of an object gets longer and/or the diameters thereof gets smaller.

For example, in case the length of an object is more than 30 cm or its inner diameter is less than 1 mm, it is difficult to precisely measure with conventional vernier calipers. The most accurate method for measuring the object length is to use an interferometer that uses a stabilized wavelength laser.

Lasers having stable wavelengths have been used as standard measurement tools for the length. In addition, HeNe lasers having stable energy transitions in gas state or lasers having wavelengths locked to absorbing lines of tube-shaped gas cell containing stable helium-neon laser or gas in gas conditions can also be used for the length measurements.

These lasers can be used as standard tools for the length measurements without periodic calibration. Thus, wavelength-stabilized laser interferometers can accurately measure the length regardless of object length, e.g., with a precision degree of 1 µm, or better, 1 nm, In addition, if the inner diameter of an object is small, the laser interferometer system can accurately measure even for the inner diameter of 1 mm or less by magnifying the shape of the object.

Recently, as the resolution of imaging devices has been increased up to degrees of high-density (HD), 4K and 8K, the laser interferometers will ensure more accurate measurement using images.

Since imaging devices such as cameras and microscopes consist of imaging optical systems that project images to imaging devices such as CCDs or CMOS, which convert images collected through the imaging surface into electrical signals, they may provide distorted images due to the aberration of the imaging optical systems therein.

For example, referring to FIG. 1, (a) is an original image and (b) demonstrates distorted portions observed by viewers, particularly, it shows more severe distortions at the outer portions thereof. To correct these distortions, high-cost imaging optical systems are used, but a certain level of distortions is inevitable.

Thus, it is not easy to accurately measure the inner and/or outer diameters of an object only based on images. Particularly, the image-based measurement makes it difficult to measure the outer diameter and the concentricity of the outer diameter.

Although Korean Patent Publication No. 10-2013-0135438 discloses an interferometer-based measurement system, this does not describe a measurement apparatus using an interferometer and an image, due to a light source emitting a phase-locked pulse laser light, an optical splitter dividing the emitted light from the light source into a first optical path and a second optical path, a first reference portion reflecting light which is divided by the optical splitter and travels along the first optical path, an optical transmission unit transmitting another light which is divided by the optical splitter and travels along the second optical path, to an object under test, an optical detection unit detecting light received by superimposing the reflected light from the first reference portion and the reflected light from the object.

SUMMARY

The purpose of the present application is to provide a precision measurement system for accurately measuring the length or inner diameter of an object by using an interferometer(s) and an image(s).

A measurement system according to one aspect of the present invention includes an interferometer configured to measure one or more distances from a movable object through a transfer device; an imaging device fixed at a specific position to capture an image within a specific range; and a control device configured to determine the length of the object captured by the imaging device using "absolute coordinates or the absolute distances". Absolute coordinates indicate a distance from a reference point to respective pixels of the image, based on the distances measured by the interferometer. Absolute distances are between the pixels of the image based on the absolute coordinates Preferably, when the interferometer measures the distances from the movable object through the transfer device, the control device determines a corresponding absolute coordinate of a pixel representing one end plane of the object from the image captured by the imaging device, based on the measured one or more distances.

Preferably, the control device determines a reference distance based on a distance measured by the interferometer when a reference plane of the object is in contact with the reference point and another distance measured by the interferometer when the reference plane is located in the image captured by the imaging device.

Preferably, when the object is captured by the imaging device, the control device determines a calibration distance corresponding to a distance between another end plane of the object and the central line; and measure the length of the object based on a distance value obtained by applying the absolute distance to the calibration distance and the reference distance. Wherein said one end plane of the object is in contact with the reference point.

Preferably, when a shape of the object captured by the imaging device is sphere and the entire portion is located in the image, the control device measures an inner diameter of the object, an outer diameter of the object, an eccentricity of the object, or an ellipticity of the object, based on the absolute distances between the pixels of the image.

Preferably, the transfer device comprises: a stage base on which the object is placed, comprising a reflective plane or a reflective mirror on a plane of the stage base; and a stage guide configured to guide moving of the stage base.

As described above, the measurement system according to an embodiment of the present invention allows to determine absolute coordinates of each pixel of an image output from an imaging device and an imaging optics based on an interferometer while moving straight objects, thus facilitating precise measurement of the length or inner diameter of the object without using high-cost optics. Also, it allows measuring a length, an inner and an outer diameter of the object to be used for measurement automation on structures. Furthermore, with a vernier caliper as a conventional measurement device, it may be difficult to measure a length of an object longer than 30 cm. A ruler can measure such a long length of an object, but it may not be suitable to measurement requiring a precision in a unit of tens μm.

However, according to the present invention, if the absolute coordinates and the absolute length are determined using an interferometer, if calibration is done, it can be possible to measure a structure of a long length object with a precision degree of tens of μm.

BRIEF DESCRIPTION OF THE DRAWINGS

FIG. 1 is an example diagram of an image distortion due to manual error of conventional imaging optics;

FIG. 2 is a diagram of a precision measurement system using an interferometer and an image in accordance with an embodiment of the present invention;

FIG. 3 is a diagram illustrating measurement of a reference distance in accordance with an embodiment of the present invention;

FIG. 4 is an example diagram illustrating the reference distance in accordance with an embodiment of the present invention;

FIG. 5 is a diagram illustrating measurement of a length of an object in accordance with an embodiment of the present invention;

FIG. 6 is an example diagram illustrating a calibration distance in accordance with an embodiment of the present invention; and FIG. 7 is an example diagram illustrating measurement of a length of an object under test in accordance with an embodiment of the present invention.

DETAILED DESCRIPTION OF THE EMBODIMENTS

Hereinafter, advantages and features of the present invention and methods of achieving them will be made clear by referring to the embodiments described in detail with reference to the accompanying drawings. The present invention may, however, be embodied in many different forms and should not be construed as limited to the embodiments set forth herein.

These embodiments are provided so that this disclosure will be thorough and complete and will fully convey the scope of the present invention to those skilled in the art to which the present invention pertains. The present invention is only defined by the scope of the claims. Like reference numerals refer to like elements throughout the specification.

As used herein, the term "and/or" includes any and all combinations of one or more of the associated listed items. The terms used herein are for describing embodiments only, but are not intended to limit the present invention.

As used herein, the singular forms "a", "an" and "the" are intended to include the plural forms, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description of the present invention, detailed description of known functions or configurations incorporated herein will be omitted in case it may make the subject matter of the present invention rather unclear.

The following terms are defined in consideration of the functions in the embodiments of the present invention, which may vary depending on the intention of the user, the operator, or the custom. Therefore, the definition should be based on the contents throughout this specification.

FIG. 2 is a diagram of a precision measurement system using an interferometer and an image in accordance with the present invention.

Referring to FIG. 2, the precision measurement system 200 includes an interferometer 210a and 210b, an imaging device 220, a control device 230, a transfer device 240, and an image output device 250.

The interferometer 210a and 210b is a measuring device based on interfering phenomena of light, and it measures the length of an object by analyzing interference patterns provided through interferences of two optical lights. For details, the interferometer 210a and 210b splits light generated from the same light source into two different optical paths, and the interference observed when the two lights travels over the respective different optical paths are combined can be used to measure a distance or an angle.

FIG. 2 illustrates only a sensor part of the interferometer 210a and 210b for detecting reflected laser light from an object. The interferometer 210a can measure the length of an object in an x-axis, and the interferometer 210b can the length of the object in a y-axis.

The interferometer(s) of the precision measurement system 200 can be configured to operate in one-dimensional axis (e.g., x-axis), two-dimensional axes (e.g., x and y axes), or three-dimensional axes (e.g., x, y and z-axes).

In addition, the interferometers 210a and 210b can be implemented using interferometer(s) with a mirror, a beam splitter and/or a polarization device or an optical fiber-based interferometer. Here, if the interferometers 210a and 210b are implemented with the optical fiber-based interferometer(s), measurement for a moving distance can be easier.

The imaging device 220 is a device to capture an image within a specific range fixed at a specific location. Preferably, the imaging device 220 can be embodied with a camera, a microscope, an imaging optical system, or an imaging element.

The control device 230 determines absolute coordinates and absolute distances based on the distance(s) measured by the interferometer 210a and 210b and the image captured by the imaging device 220 so as to determine the length of an object captured by the imaging device 220.

Here, the absolute coordinates represent a distance between a reference point and each pixel of the captured image, and the absolute distances represent an actual distance corresponding to a respective distance between the pixels of the image.

The transfer device 240 including a base 241 and a stage guide is configured to move (or transfer) the object. Preferably, the object can be placed on the top of the stage base 241, and a reflective plane or a reflective mirror 243 can be provided on one end of the stage base 241, the stage guide 242 can be configured to guide moving of the stage base 241.

Here, the reflective plane or reflective mirror 243 functions reflect back a laser beam provided from the interferometer 210a and 210b to the interferometer 210a and 210b.

The image output device 250 is configured to demonstrate the image captured by the image device 220 and this can preferably be a monitor.

FIG. 3 is a diagram illustrating measurement of a reference distance in accordance with an embodiment of the present invention. FIG. 4 is a diagram illustrating a reference distance measured with the diagram of FIG. 3. Referring to FIG. 3(a), in a state when a reference plane of the object placed on the stage base 241 is in contact with a reference point, the interferometer 210 measures a corresponding distance using the reflective plane or reflective mirror 243 provided on one end of the stage base 241.

Next, referring to FIG. 3(b), when the stage base 241 moves along with the stage guide 242, so the reference plane is placed on a center line of the image captured by the imaging device 220 (e.g., when it is seen through the image output device 250 that the reference plane of the object is positioned on the center line of the image), the interferometer 210 measures a corresponding distance using the reflective plane or reflective mirror 243 provided on one end of the stage base 241.

As shown in FIG. 4, the control device 230 determines a reference distance L from the reference point based on the two distances measured by the interferometer 210 of FIGS. 3A and 3B.

The reference distance L is a distance between the reference point and the center line of the imaging device 220.

Preferably, after the determination on the reference distance L, the control device 230 determines absolute coordinates, which respectively correspond to a distance between the reference point and each pixel of the image captured by the imaging device 220, and absolute distances between the pixels.

Here, if the imaging optical system of the imaging device 220 is consistently maintained, the absolute distances between the pixels of the image can effectively be used without additional calibration.

In addition, if relative coordinates between the pixels of the image have been measured, and the absolute distance is determined for a certain pixel of the image by the control device 230, the absolute coordinates between other pixels can automatically be calculated.

However, if the relative coordinates between the pixels of the image have not been measured, the control device 230 can determine the respective absolute coordinates of the pixels of the image by measuring the distance according to the moving of the object using the interferometer 210.

Hereinafter, a method for measuring the length of an object using the reference distance, the absolute coordinates and the absolute distances determined with reference to FIGS. 3 and 4 will be described more in detail.

FIG. 5 is a diagram illustrating measurement of a length of an object in accordance with an embodiment of the present invention. FIG. 6 is an example diagram illustrating a calibration distance in accordance with an embodiment of the present invention.

Referring to FIG. 5, when the reference plane of the object under test which is placed on the top of the stage base 241 which is in contact with the reference point, the control device 230 measures the length of the object according to a location of the object in the image captured by the imaging device 230.

More specifically, in a state when the object is in contact with the reference point, if one end plane of the object is positioned in the image captured by the imaging device 220, the control device 220 determines a calibration distance ΔL corresponding to the portion of the object and the center line of the image, as illustrated in FIG. 6.

In addition, the control device 220 applies the absolute distance to the calibration distance ΔL to determine an actual distance value represented by the calibration distance ΔL and measures the length of the object by applying the determined distance value to the reference distance L.

For example, as illustrated in FIG. 6, if the end plane of the object is shown short by ΔL from the center line of the image, the length of the object will be L−ΔL. In contrast, if the end plane of the object is shown long by ΔL from the center line of the image, the length of the object will be L+ΔL.

If the calibration distance ΔL is zero, e.g., if the end plane of the object is positioned at the center line of the image, the length of the object will be equal to the reference distance L.

In addition, the control device 220 can measure the length of the object based on the position of the object in the image captured by the imaging device 220 and the absolute coordinates of pixels corresponding to the end plane of the object. Here, it is assumed that the object under test is in contact with the reference point.

That is, since the control device 220 can measure the length of an object only with an image captured when the object is in contact with the reference point, using the absolute coordinates or the absolute distances of respective pixels in the image, it enables to achieve a length measurement automation and allows a length measurement with a precision degree of a few μm or more object even if the length of the object is relatively long.

Here, the precision of the measurement can be determined based on the number of pixels of the imaging component in 220, a magnification of the imaging device 220, imaging optical system, and the interferometer 210. In principle, the measurement system 200 can have a precision of sub-micron to 10 nm. The precision becomes higher if the wavelength of the interferometer becomes more stable. One can even get the length measurement precision of 1 ppm, e.g. 1 μm for 1 meter and 100 nm for 0.1 meter measurement depending on the wavelength stability of the interferometer.

FIG. 5 depicts one-dimensional measurement for the object under test as an embodiment, however if interferometers 210a and 210b and an imaging device capable of measuring lengths with respect to x and y-axes are added, it facilities a two-dimensional measurement for the object.

In addition, if an interferometer and an imaging device capable of measuring lengths with respect to z-axis are added, three-dimensional measurement can be facilitated based on movement of the object in a vertical direction.

FIG. 7 is an example diagram illustrating measurement of a length of an object under test in accordance with an embodiment of the present invention.

Referring to FIG. 7, the imaging device 220 captures an object under test of a sphere shape placed on a transparent glass plate (or plane), and an inner diameter, an outer diameter, an eccentricity or an ellipticity of the object.

Here, the transparent glass plate can be positioned such that an image is taken on an image plane of the imaging device 200 and is in line with a plane of the object under test.

Preferably, if the entire portion of the object under test of a sphere shape is positioned in an image captured by the imaging device 220, a length of the object can be measured based on a length in the captured image and absolute distances between respective pixels of the image.

In addition, the object under test of a sphere shape can be placed at the top of the transfer device 240 to be taken through the imaging device 220. The control device 230 can measure the length by applying the absolute distances to the length in the image only based on image(s) captured by the imaging device 220.

For example, since the control system 230 can conveniently measure the inner diameter, the outer diameter, eccentricity, or ellipticity of an object, only using the image(s) captured by the imaging device 220, the precision measurement system 200 is advantageous for automatic measurement and ensures faster and more convenient length measurement.

This method is particularly useful when the inner diameter of the object is as small as 1 mm or less. For example, this method is more effective without actual contact on the object, compared to a method of measuring a small inner diameter (i.e., a method of determining a size of the inner diameter based on how tightly jigs with known outer diameters such as Vermont gauge are inserted therein.

Preferred embodiments for the precision measurement system using interferometers and visions according to the present invention are described as above. However, the present invention is not limited thereto, but is intended to cover various modification and equivalent arrangements included within the spirit and scope of the appended claims.

What is claimed is:

1. A precision measurement system, comprising:
   an interferometer configured to measure one or more distances from an object which is movable through a transfer device;
   an imaging device fixed at a specific position, the imaging device being configured to capture an image of an object positioned within a specific range; and
   a control device configured to:
   determine a respective absolute coordinate indicating a distance from a reference point to a respective pixel of the image, based on the one or more distances measured by the interferometer and the image captured by the imaging device;
   determine absolute distances between the pixels of the image based on the absolute coordinates;
   measure a length of the object captured by the imaging device using the absolute coordinates or the absolute distances; and
   determine a reference distance based on a distance measured by the interferometer when a reference plane of the object is in contact with the reference point and another distance measured by the interferometer when the reference plane is located in the image captured by the imaging device.

2. The system of claim 1, wherein when the interferometer measures the one or more distances from the movable object through the transfer device, the control device determines a corresponding absolute coordinate of a pixel representing one end plane of the object from the image captured by the imaging device, based on the measured distances.

3. The system of claim 1, wherein when the object is measured by the imaging device, the control device determines a calibration distance corresponding to a distance between another end plane of the object and the central line; and measure the length of the object based on a distance value obtained by applying the absolute distance to the calibration distance and the reference distance,
   wherein said one end plane of the object being in contact with the reference point.

4. The system of claim 1, wherein a shape of the object captured by the imaging device is a sphere and the entire portion of the object is located in the image, the control device measures an inner diameter of the object, an outer diameter of the object, an eccentricity of the object, or an ellipticity of the object, based on the absolute distances between the pixels of the image.

5. The system of claim 1, wherein the transfer device comprises:
   a stage base on which the object is placed, comprising a reflective plane or a reflective mirror on a plane of the stage base; and
   a stage guide configured to guide moving of the stage base.

* * * * *